United States Patent
Kim

(10) Patent No.: US 11,577,379 B2
(45) Date of Patent: Feb. 14, 2023

(54) ROBOT AND METHOD FOR RECOGNIZING WAKE-UP WORD THEREOF

(71) Applicant: LG ELECTRONICS INC., Seoul (KR)

(72) Inventor: Namgeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 262 days.

(21) Appl. No.: 16/865,224

(22) Filed: May 1, 2020

(65) Prior Publication Data

US 2021/0016431 A1 Jan. 21, 2021

Related U.S. Application Data

(63) Continuation-in-part of application No. PCT/KR2019/008984, filed on Jul. 19, 2019.

(30) Foreign Application Priority Data

Sep. 18, 2019 (KR) .......................... 10-2019-0114461

(51) Int. Cl.
*B25J 9/00* (2006.01)
*B25J 19/02* (2006.01)
(Continued)

(52) U.S. Cl.
CPC ............. *B25J 9/0003* (2013.01); *B25J 9/161* (2013.01); *B25J 9/163* (2013.01); *B25J 9/1694* (2013.01);
(Continued)

(58) Field of Classification Search
USPC ..................................................... 704/1–504
See application file for complete search history.

(56) References Cited

U.S. PATENT DOCUMENTS 9,812,128 B2 * 11/2017 Mixter .................... G10L 15/22
9,923,389 B2 * 3/2018 Kwon ..................... H02J 50/12
(Continued)

FOREIGN PATENT DOCUMENTS

| KR | 1020170087207 | 7/2017 |
| KR | 1020190065094 | 6/2019 |
| KR | 1020190065201 | 6/2019 |

OTHER PUBLICATIONS

PCT International Application No. PCT/KR2019/008984, Written Opinion of the International Searching Authority dated Apr. 14, 2020, 11 pages.

*Primary Examiner* — Marcus T Riley
(74) *Attorney, Agent, or Firm* — Lee, Hong, Degerman, Kang & Waimey PC

(57) ABSTRACT

Provided is a robot including a microphone configured to acquire a sound signal corresponding to a sound generated near the robot, a camera, an output interface including at least one of a display configured to output a wake-up screen or a speaker configured to output a wake-up sound when the robot wakes up, and a processor configured to recognize whether the acquired sound includes a voice of a person, activate the camera when the sound includes a voice of a person, recognize whether a person is present in an image acquired by the activated camera, set a wake-up word recognition sensitivity based on a recognition result as to whether a person is present, and recognize whether a wake-up word is included voice data of a user acquired through the microphone based on the set wake-up word recognition sensitivity.

18 Claims, 11 Drawing Sheets

(51) Int. Cl.
  *B25J 9/16*    (2006.01)
  *G10L 15/22*   (2006.01)
  *G10L 15/08*   (2006.01)

(52) U.S. Cl.
  CPC ........... *B25J 9/1697* (2013.01); *B25J 19/023* (2013.01); *B25J 19/026* (2013.01); *G10L 15/22* (2013.01); *G10L 2015/088* (2013.01); *G10L 2015/223* (2013.01)

(56) References Cited

U.S. PATENT DOCUMENTS

| | | | | |
|---|---|---|---|---|
| 9,972,320 | B2 * | 5/2018 | Melendo Casado | G10L 25/78 |
| 10,546,583 | B2 * | 1/2020 | White | G10L 15/28 |
| 10,762,900 | B2 * | 9/2020 | Ben-dor | G10L 13/00 |
| 2006/0143017 | A1 * | 6/2006 | Sonoura | G10L 15/26 |
| | | | | 704/E15.045 |
| 2012/0315016 | A1 * | 12/2012 | Fung | H04N 5/2252 |
| | | | | 348/222.1 |
| 2013/0127980 | A1 * | 5/2013 | Haddick | G06F 3/013 |
| | | | | 348/14.08 |
| 2013/0278631 | A1 * | 10/2013 | Border | G06Q 30/02 |
| | | | | 345/633 |
| 2015/0375395 | A1 * | 12/2015 | Kwon | A47L 9/2873 |
| | | | | 901/30 |
| 2016/0343376 | A1 * | 11/2016 | Cai | G10L 17/22 |
| 2017/0025124 | A1 * | 1/2017 | Mixter | G10L 15/32 |
| 2017/0206900 | A1 * | 7/2017 | Lee | H04R 1/406 |
| 2018/0061419 | A1 * | 3/2018 | Melendo Casado | G10L 25/78 |
| 2018/0285463 | A1 * | 10/2018 | Choi | G06F 16/9535 |
| 2019/0066670 | A1 * | 2/2019 | White | G10L 15/28 |
| 2019/0198018 | A1 * | 6/2019 | Wang | G10L 25/78 |
| 2019/0279615 | A1 * | 9/2019 | Ben-dor | H04L 41/0893 |
| 2020/0005768 | A1 * | 1/2020 | Chae | G10L 15/22 |
| 2020/0267936 | A1 * | 8/2020 | Tran | A01K 29/005 |
| 2020/0294401 | A1 * | 9/2020 | Kerecsen | G05D 1/0287 |
| 2021/0016431 | A1 * | 1/2021 | Kim | B25J 9/161 |
| 2021/0138661 | A1 * | 5/2021 | Kim | A61B 5/0022 |
| 2021/0192314 | A1 * | 6/2021 | Aarts | G06F 3/105 |
| 2021/0366506 | A1 * | 11/2021 | Han | G06N 20/10 |

* cited by examiner

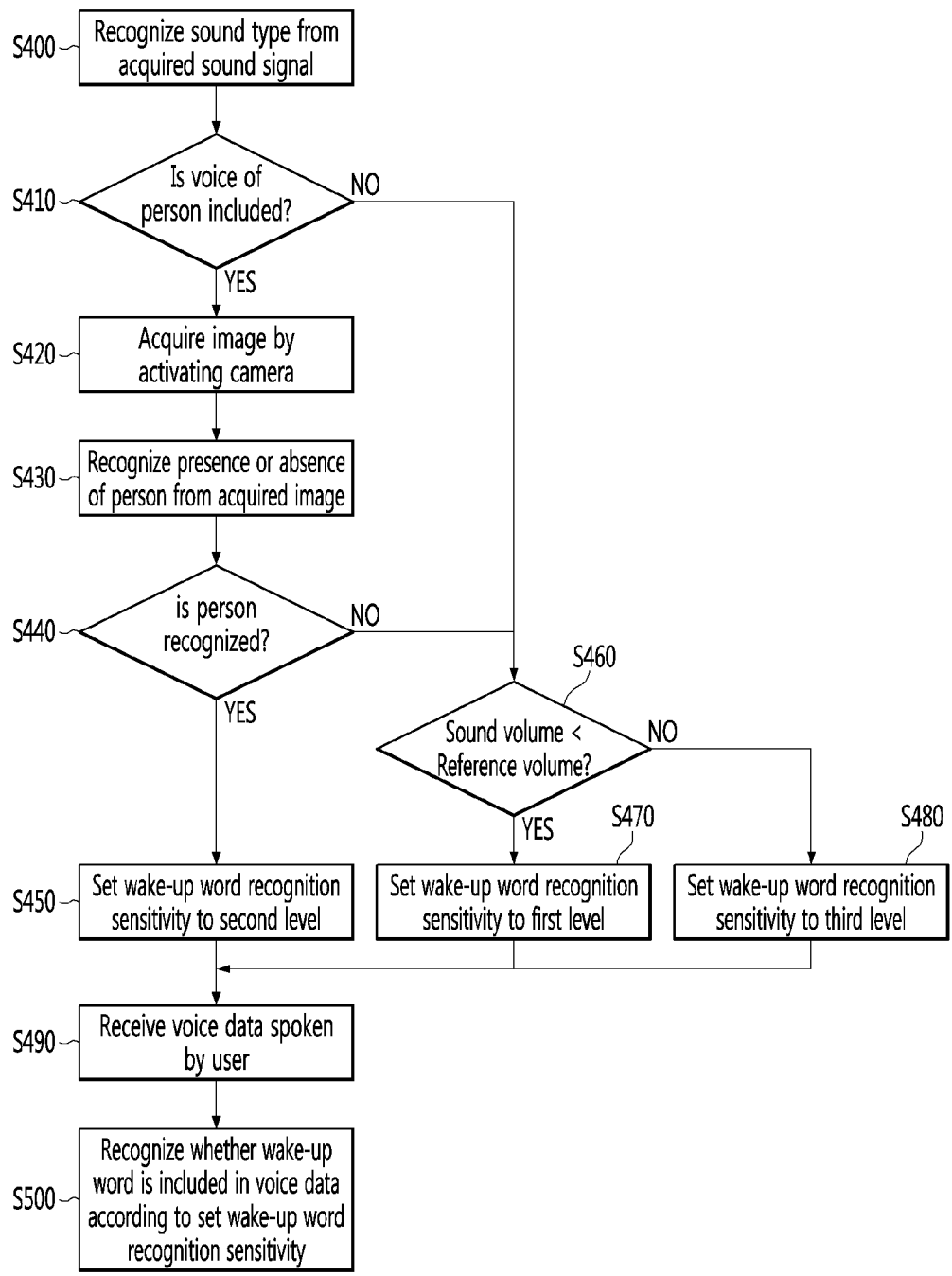

ROBOT AND METHOD FOR RECOGNIZING WAKE-UP WORD THEREOF

CROSS-REFERENCE TO RELATED APPLICATIONS

This application is a continuation-in-part of International Application No. PCT/KR2019/008984, filed on Jul. 19, 2019, and claims the benefit of Korean Patent Application No. 10-2019-0114461, filed on Sep. 18, 2019, the contents of which are hereby incorporated by reference herein in their entirety.

FIELD

The present disclosure relates to a robot and a method for recognizing a wake-up word thereof.

BACKGROUND

A robot is a machine that automatically handles or operates a given task by its own ability. Robots are generally classified into various fields such as industrial robots, medical robots, robots for space, and submarine robots. Recently, communication robots capable of communicating or interacting with humans through voice or gestures has increased.

Such a communication robot may include various types of robots, such as a guide robot disposed at a specific place and guiding various information to a user, a home robot provided in a home, and the like. In addition, the communication robot may include an educational robot that guides or assists learning of a learner through interaction with the learner.

The communication robot enters a standby state while not in operation to minimize power consumption, and when a trigger word or wake-up word spoken by a user is detected, the communication robot is switched to a wake-up state and provides a predetermined operation.

Meanwhile, the degree of noise may vary depending on a surrounding environment of the communication robot, and if the loudness of noise is relatively large, the user's speech may not be recognized smoothly, causing user inconvenience.

SUMMARY

An aspect of the present disclosure is directed to provide a robot capable of smoothly recognizing a wake-up word irrespective of the degree of ambient noise.

Another aspect of the present disclosure is directed to implement a robot capable of varying sensitivity of recognition of a wake-up word according to ambient noise characteristics.

To achieve these and other advantages and in accordance with the purpose of the invention, as embodied and broadly described herein, there is provided a robot including: a microphone configured to acquire a sound signal corresponding to a sound generated near the robot; a camera; an output interface including at least one of a display configured to output a wake-up screen or a speaker configured to output a wake-up sound when the robot wakes up; and a processor configured to: recognize whether the acquired sound includes a voice of a person, activate the camera when the sound includes a voice of a person, recognize whether a person is present in an image acquired by the activated camera, set a wake-up word recognition sensitivity based on a recognition result as to whether a person is present, and recognize whether a wake-up word is included voice data of a user acquired through the microphone based on the set wake-up word recognition sensitivity.

According to an embodiment, the processor may be configured to set the wake-up word recognition sensitivity to a first level when a person is recognized from the acquired image.

According to an embodiment, the processor may be configured to set the wake-up word recognition sensitivity to be higher than the first level when people equal to or larger than a reference number are recognized from the acquired image.

According to an embodiment, the processor may be configured to set the wake-up word recognition sensitivity to a second level lower than the first level when no person is recognized from the acquired image.

According to an embodiment, processor may be configured to measure a sound volume based on the sound signal if no person is recognized from the acquired image, and set the wake-up word recognition sensitivity based on the measured sound volume.

According to an embodiment, the processor may be configured to set the wake-up word recognition sensitivity to a second level lower than the first level when the measured sound volume is larger than a reference volume, and set the wake-up word recognition sensitivity to a third level higher than the first level when the measured sound volume is smaller than the reference volume.

According to an embodiment, the processor may be configured to recognize whether the voice of a person is included in the sound based on a signal component having a frequency band corresponding to a voice of a person, in the sound signal.

According to an embodiment, the processor may be configured to measure a sound volume based on the sound signal when it is recognized that the voice of a person is not included in the sound, and set the wake-up word recognition sensitivity to be lower as the measured sound volume is larger.

According to an embodiment, the robot may further include an illumination sensor configured to measure an intensity of illumination, wherein the processor may be configured to increase the set wake-up word recognition sensitivity when a sensing value of the illumination sensor is lower than a reference sensing value, and decrease the set wake-up word recognition sensitivity when the sensing value of the illumination sensor is higher than the reference sensing value.

According to an embodiment, the processor may be configured to recognize at least one of a syllable, a character, or a word spoken by the user from the voice data, compares at least one of the recognized syllable, character, or word with the wake-up word, and recognize whether the wake-up word is included from the voice data based on a comparison result and the wake-up word recognition sensitivity.

According to an embodiment, the processor may be configured to acquire a matching rate between at least one of the recognized syllable, character, or word and the wake-up word, and recognize that the voice data includes the wake-up word when the acquired matching rate is higher than a reference matching rate of the current set wake-up word recognition sensitivity.

According to an embodiment, the robot may further include a memory including a learning model trained based on machine learning, wherein the processor may be configured to recognize at least one of the syllable, character, or word from feature points extracted from the voice data through the learning model.

According to an embodiment, the processor may be configured to control the output interface to output at least one of the wake-up screen or the wake-up sound as the robot wakes up when it is recognized that the voice data includes the wake-up word.

According to an embodiment, the robot may further include: a communication interface configured to be connected to a server, wherein the processor may be configured to transmit the acquired sound signal to the server, transmit the acquired voice data to the server, receive a wake-up control signal based on the recognition result of the voice data from the server, and control the output interface based on the received wake-up control signal.

In another aspect of the present disclosure, there is provided a method of recognizing a wake-up word using a robot, including: acquiring a sound signal through a microphone of the robot; recognizing whether the acquired sound signal includes a voice of a person; activating a camera included in the robot when the acquired sound signal includes a voice of a person; recognizing whether a person is present in an image acquired by the activated camera; setting a wake-up word recognition sensitivity based on the recognition result; recognizing whether the wake-up word is included in voice data of a user acquired through the microphone based on the set wake-up word recognition sensitivity; and waking up the robot when it is recognized that the wake-up word is included in the voice data.

In another aspect of the present disclosure, there is provided a server including: a communication interface configured to receive a sound signal corresponding to a sound generated near a robot from the robot; and a processor configured to receive an image in the vicinity of the robot from the robot through the communication interface when a voice of a person is recognized from the received sound signal, recognize whether a person is present from the received image, set a wake-up word recognition sensitivity based on a recognition result, and recognize whether a wake-up word is included from voice data of a user received through the communication interface based on the set wake-up word recognition sensitivity.

It is to be understood that both the foregoing general description and the following detailed description of the present disclosure are exemplary and explanatory and are intended to provide further explanation of the invention as claimed.

BRIEF DESCRIPTION OF THE DRAWINGS

FIG. 13 is a flowchart specifically illustrating a wake-up word recognition sensitivity setting operation and a wake-up word recognition operation of a robot according to an embodiment of the present disclosure.

DETAILED DESCRIPTION

Figure 1:
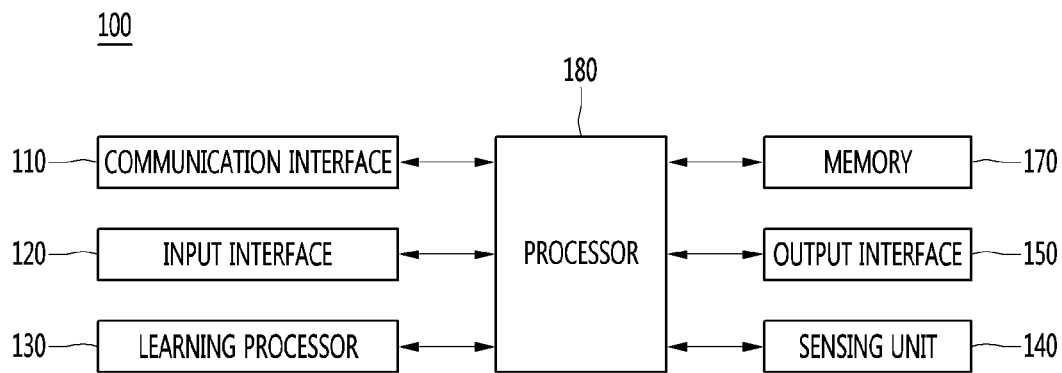
FIG. 1 illustrates an artificial intelligence (AI) device including a robot according to an embodiment of the present disclosure.

Hereinafter, embodiments of the present disclosure will be described in detail with reference to the accompanying drawings. The accompanying drawings are used to help easily understand the technical idea of the present invention and it should be understood that the idea of the present invention is not limited by the accompanying drawings. The idea of the present invention should be construed to extend to any alterations, equivalents and substitutes besides the accompanying drawings.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensing unit 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
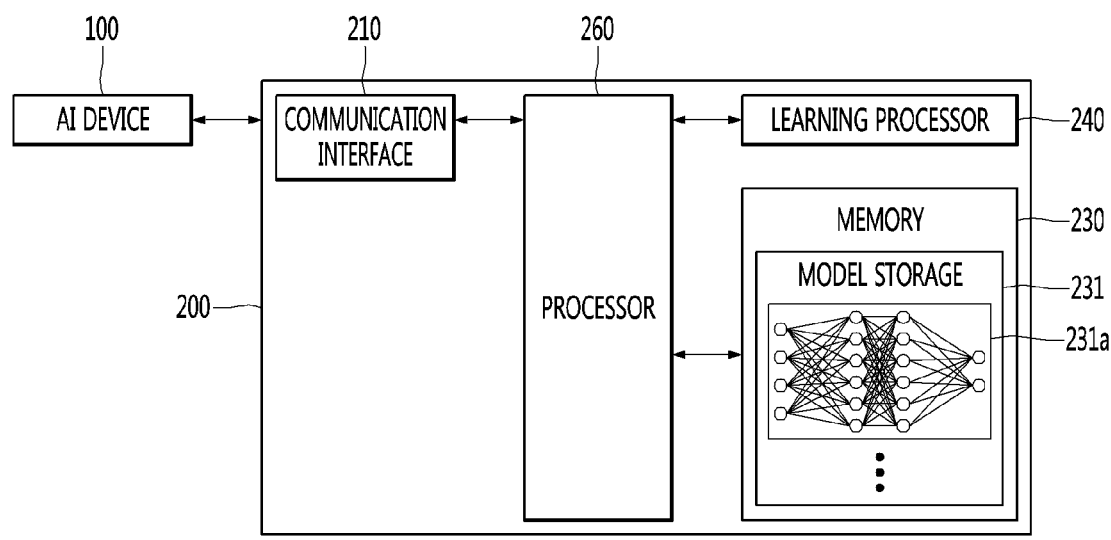
FIG. 2 illustrates an AI server connected to a robot according to an embodiment of the present disclosure.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
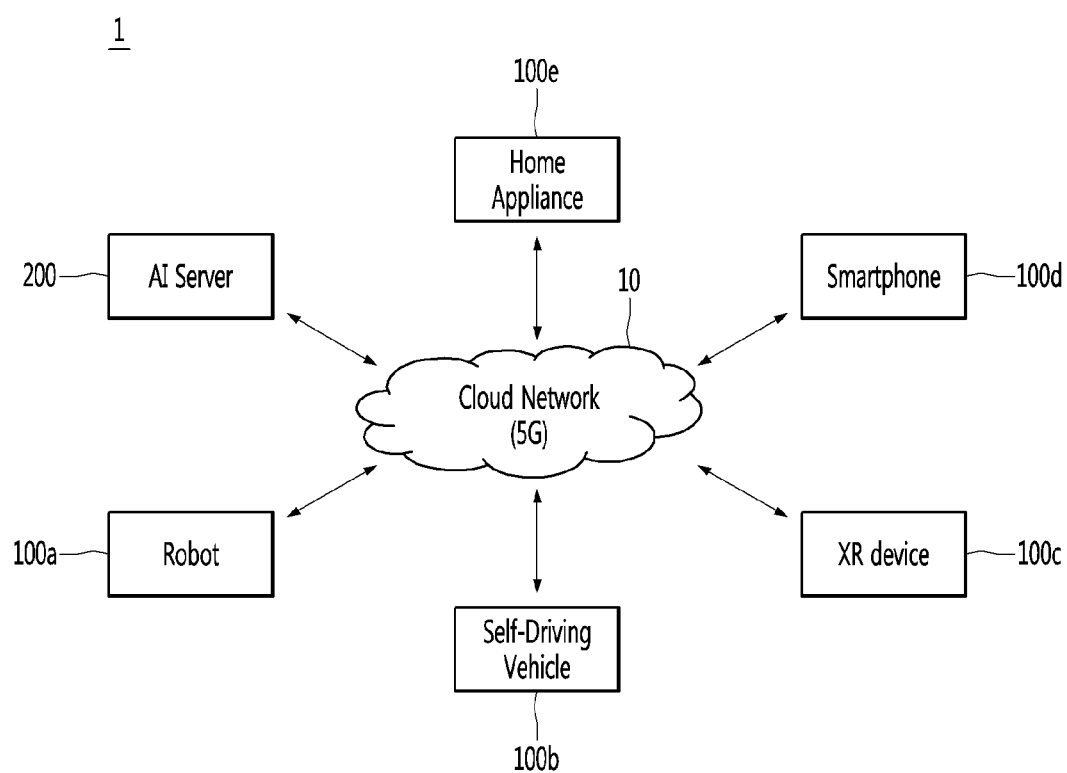
FIG. 3 illustrates an AI system including a robot according to an embodiment of the present disclosure.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
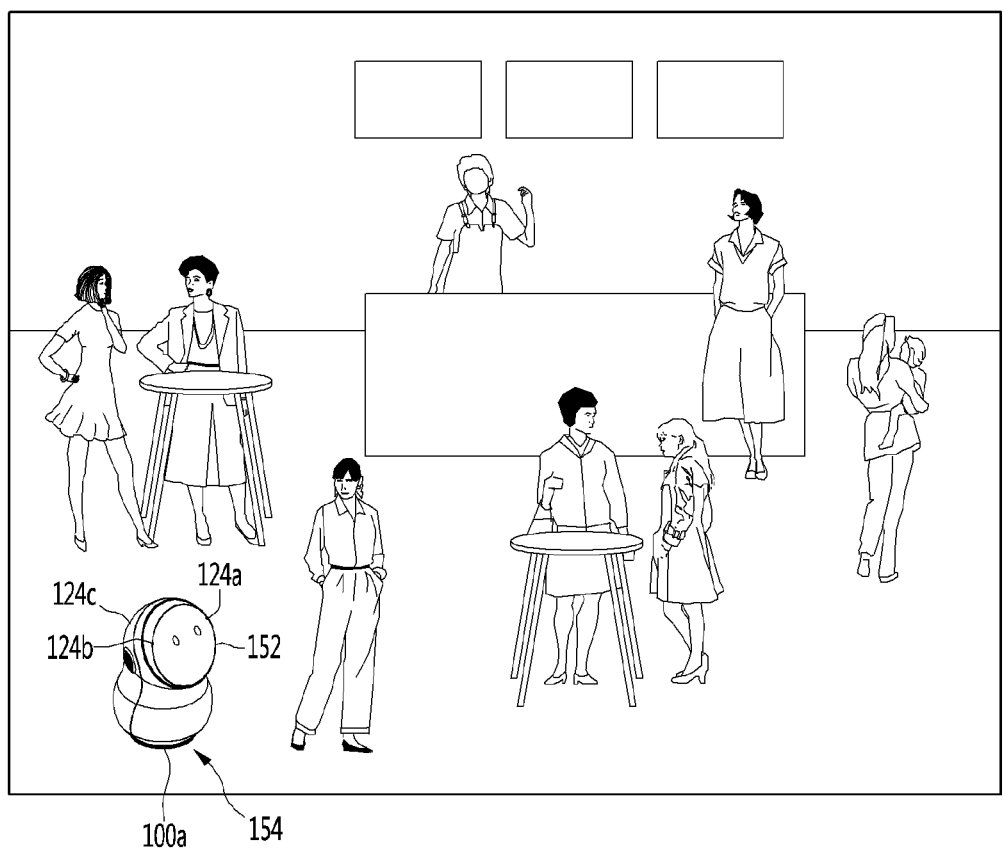
FIG. 4 is a view illustrating a configuration in which a robot is disposed in a predetermined space according to an embodiment of the present disclosure.

FIG. 4 is a view illustrating a configuration in which a robot is disposed in a predetermined space according to an embodiment of the present disclosure.

The robot 100a according to an embodiment of the present disclosure may be disposed at various places such as a home, a school, a cafe, a public institution, and the like. That is, the robot 100a may correspond to a communication robot that performs operations such as providing information or content to the user or inducing a specific action through communication or interaction with the user at the place.

For example, referring to FIG. 4, the robot 100a may be arranged in a cafe to provide various information or services to customers who use the cafe.

The robot 100a may wake up in response to utterance of a wake-up word of a specific customer (user) to provide a service to the user. For example, as the robot 100a wakes up, the robot 100a may output a predetermined screen through the display 152 or may output a predetermined sound through the sound output interface 154 (e.g., a speaker).

To this end, the robot 100a may include at least one microphone 124a to 124c for acquiring a voice of a user or a sound around the robot. In addition, the robot 100a may provide information to the user through the display 152 for outputting graphics or text or the sound output interface 154 (e.g., a speaker) for outputting voice or sound.

Meanwhile, the cafe may have noise due to conversation of other people, sound (music, etc.) output from an audio facility, driving of a machine. In this case, the robot 100a may receive the user's voice and noise together through the microphones 124a to 124c, and in this case, the user's voice may not be recognized smoothly depending on a magnitude or characteristic of the noise.

If the user's voice is not recognized smoothly, the robot 100a may not wake up, and in this case, the user have to repeatedly speak the wake-up word, so that the user may feel inconvenience.

In this case, the robot 100a according to an embodiment of the present disclosure may recognize the user's wake-up word more effectively by adjusting recognition wake-up word recognition sensitivity according to the magnitude or characteristic of the noise generated in the surroundings. The configuration and operation of the robot 100a related to this will be described below with reference to FIGS. 5 to 11.

Figure 5:
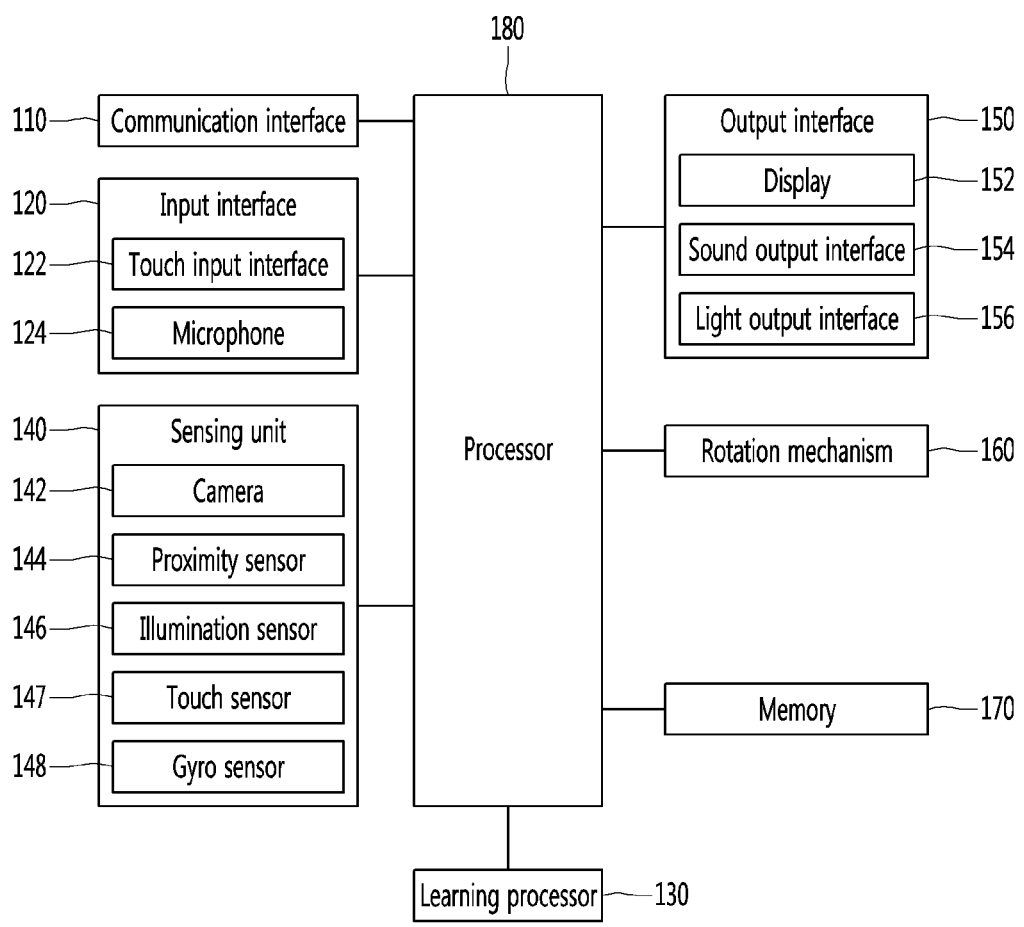
FIG. 5 is a block diagram illustrating a control configuration of a robot according to an embodiment of the present disclosure.

FIG. 5 is a block diagram illustrating a control configuration of a robot according to an embodiment of the present disclosure.

Referring to FIG. 5, the robot 100a may include a communication interface 110, an input interface 120, a learning processor 130, a sensing unit 140, an output interface 150, a rotation mechanism 160, a memory 170, and a processor 180. The components illustrated in FIG. 5 are examples for convenience of description, and the robot 100a may include more or fewer components than those illustrated in FIG. 5.

Meanwhile, the contents related to the AI device 100 of FIG. 1 are similarly applied to the robot 100a of the present disclosure, and thus, the descriptions overlapping with those described above in FIG. 1 will be omitted.

The communication interface 110 may include communication modules for connecting the robot 100a to a server, a mobile terminal, or another robot through a network. Each of the communication modules may support any one of the communication technologies described above with reference to FIG. 1.

For example, the robot 100a may be connected to a network through an access point such as a router. Accordingly, the robot 100a may provide various information acquired through the input interface 120 or the sensing unit 140 to a server or a mobile terminal through the network. The information transmitted to the server may be stored in the server or transmitted to another electronic device (mobile terminal, robot, etc.) connected to the server.

The input interface 120 may include at least one input means for acquiring various types of data. For example, the at least one input interface may include a physical input interface such as a button or a dial, a touch input interface 122 such as a touch pad or a touch panel, a microphone 124 that receives a user's voice or a sound around the robot 100a. The user may input various requests or commands to the robot 100a through the input interface 120.

The processor 180 may acquire sound data corresponding to the noise around the robot 100a through the microphone 124. The processor 180 may check a sound volume (dB) or the characteristic (type) of the sound data, and set the recognition wake-up word recognition sensitivity based on the checking result.

According to an embodiment, when a voice or sound recognition operation is performed by a server connected to the robot 100a, the processor 180 may transmit the acquired sound data to the server. The server may check the sound volume or characteristic (type) of the received sound data, and set recognition wake-up word recognition sensitivity based on the checking result.

Meanwhile, the processor 180 may transmit voice data of the user received through the microphone 124 to the server through the communication interface 110. The server may analyze the voice data to recognize a wake-up word, a command, a request, and the like in the voice data, and provide a recognition result to the robot 100a.

For example, the server may recognize the wake-up word, the command, the request, and the like included in the voice data by extracting the feature points in the voice data and comparing the extracted feature points with feature points of each word or character in a voice database.

Alternatively, the processor 180 of the robot 100a may directly recognize the wake-up word, the command, the request, and the like in the voice data using a voice database stored in the memory 170.

According to an embodiment, the server may be implemented as the AI server 200 described above with reference to FIG. 2, in which case the server may recognize the wake-up word, the command, the request, and the like in the voice data through a model (ANN 231a) trained through the learning processor 240. The processor 180 may switch an operation mode or process an instruction or a request based on the recognition result.

According to an embodiment, the processor 180 may directly recognize the wake-up word, the command, the request, and the like in the voice data through a model learned by the learning processor 130 in the robot 100a. Alternatively, the processor 180 may receive data corresponding to the learned model from the server, store the data corresponding to the learned model in the memory 170, and recognize the wake-up word, the command, the request, and the like in the voice data through the stored data.

That is, according to an embodiment of the present disclosure, the voice data of the user may be recognized by the robot 100a or the server connected thereto.

The sensing unit 140 may include at least one sensor that senses various information around the robot 100a. For example, the sensing unit 140 may include various sensors such as a camera 142, a proximity sensor 144, an illumination sensor 146, a touch sensor 147, and a gyro sensor (gyroscope) 148.

The camera 142 may acquire an image around the robot 100a. According to an embodiment of the present disclosure, the processor 180 may acquire an image including the user's face through the camera 142 to recognize the user, or acquire a user's gesture or facial expression.

The proximity sensor 144 may detect that an object such as the user or the like approaches the robot 100a. For example, when a user's approach is detected by the proximity sensor 144, the processor 180 may output an initial screen or an initial voice through the output interface 150 to induce the user to use the robot 100a.

The illumination sensor 146 may detect the brightness of a space where the robot 100a is disposed. The processor 180 may control the components to perform various operations based on a detection result of the illumination sensor 146 and/or time zone information.

The touch sensor 147 may detect that a part of the user's body contacts a predetermined area of the robot 100a. For example, the touch sensor 147 may be disposed at a head portion of the robot 100a, specifically, at an upper portion or a rear portion of a face region including the display 152, but is not limited thereto.

The gyro sensor 148 may detect a rotation angle or tilt of the robot 100a. The processor 180 may recognize a direction in which the robot 100a faces based on the detection result of the gyro sensor 148 or detect an impact from the outside. For example, the gyro sensor 148 may be provided in the body portion of the robot 100a, but is not limited thereto.

The output interface 150 may output an operation or state of the robot 100a or various information or content related to various services, programs, applications, etc., executed in the robot 100a. In addition, the output interface 150 may output various messages or information for performing interaction with the user.

The output interface 150 may include a display 152, a sound output interface 154, a light output interface 156, and the like.

The display 152 may output the aforementioned various information or messages in a graphic form. According to an embodiment, the display 152 may be implemented in the form of a touch screen together with the touch input interface 122. In this case, the display 152 may function as an input means as well as an output means.

The sound output interface 154 may output the various information or messages in the form of voice or sound. For example, the sound output interface 154 may include a speaker.

The light output interface 156 may be implemented as a light source such as an LED. The processor 180 may indicate a state of the robot 100a through the light output interface 156. According to an embodiment, the light output interface 156 as an auxiliary output means may provide various information to the user along with the display 152 and/or the sound output interface 154.

The rotation mechanism 160 may include components (motor, etc.) for rotating the robot 100a about a vertical axis. The processor 180 may rotate the robot 100a by controlling the rotation mechanism 160 to change a direction in which the display 152 and the camera 142 of the robot 100a face.

According to an embodiment, the rotation mechanism 160 may further include components for tilting the robot 100a at a predetermined angle in a front-rear direction.

The memory 170 may store various data such as control data for controlling operations of components included in the robot 100a, data for performing an operation based on an input acquired through the input interface 120 or based on information acquired through the sensing unit 140, and the like.

In addition, the memory 170 may store program data such as a software module or an application executed by at least one processor or controller included in the processor 180.

The memory 170 may store an algorithm for checking a sound volume and characteristic (type) of sound data and setting recognition wake-up word recognition sensitivity based on the result of the checking.

In addition, the memory 170 according to an embodiment of the present disclosure may store an algorithm or a voice database for recognizing user's voice data. Alternatively, the memory 170 may store a machine learning-based learning model learned by the learning processor 130 or the server's learning processor 240.

The memory 170 may include various storage devices such as a ROM, a RAM, an EPROM, a flash drive, a hard drive, and the like in hardware.

The processor 180 may include at least one processor or controller that controls the operation of the robot 100a. In detail, the processor 180 may include at least one CPU, an application processor (AP), a microcomputer (or micom), an integrated circuit, an application specific integrated circuit (ASIC), and the like.

The processor 180 may control an overall operation of the components included in the robot 100a. According to an embodiment, the processor 180 may be implemented as an integrated processor including an ISP for processing image signals acquired through the camera 142 to generate image data and a display controller for controlling the operation of the display 152.

Hereinafter, embodiments related to an operation of setting of wake-up word recognition sensitivity and wake-up word recognition of the robot 100a will be described with reference to FIGS. 6 to 11.

Figure 6:
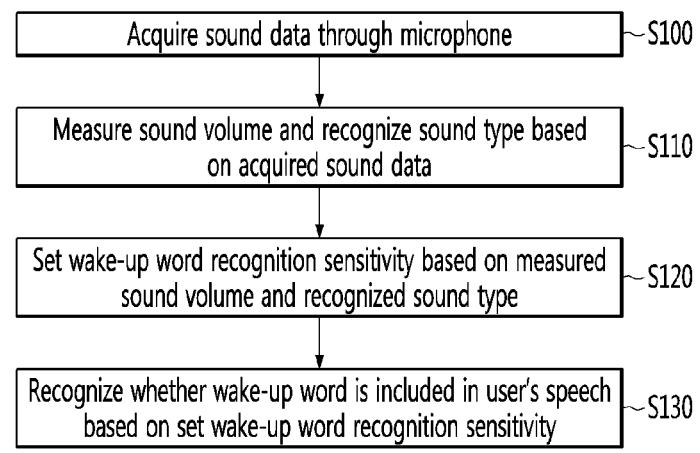
FIG. 6 is a flowchart illustrating a wake-up word recognition operation of a robot according to an embodiment.

FIG. 6 is a flowchart illustrating an operation of wake-up word recognition of a robot according to an embodiment of the present disclosure.

Referring to FIG. 6, the robot 100a may acquire sound data corresponding to noise generated in the vicinity of the robot 100a through the microphone 124 (S100).

The robot 100a may activate the microphone 124 to recognize the wake-up word even in a standby state.

As the microphone 124 is activated, the processor 180 may acquire sound data corresponding to noise occurring in the surroundings.

The robot 100a may measure a sound volume based on the acquired sound data and recognize a type (characteristic) of the sound (S110).

The sound data may include a sound signal corresponding to the noise. The processor 180 may measure the sound volume based on an amplitude of the sound signal included in the sound data. For example, the processor 180 may represent the sound volume in the form of a volume relative to a reference volume such as a decibel (dB) unit.

In addition, the processor 180 may recognize the type of the sound by analyzing the sound signal for each frequency band. For example, the processor 180 may classify the type of the sound based on whether a human voice is included in the noise.

The robot 100a may set wake-up word recognition sensitivity based on the measured sound volume and the recognized sound type (S120).

The wake-up word recognition sensitivity may refer to the degree to which a wake-up word is determined to be included in a voice spoken by a user.

For example, the wake-up word recognition sensitivity may be related to a matching rate between a syllable, a character, or a word recognized from a voice spoken by a user and a syllable, character, or word corresponding to a pre-registered wake-up word. In this case, as the wake-up word recognition sensitivity is higher, a criterion of the matching rate determined as the wake-up word may increase. Meanwhile, as the wake-up word recognition sensitivity is lower, the criterion of the matching rate may decrease.

According to an embodiment, the wake-up word recognition sensitivity may be related to a matching rate between feature points extracted from a signal (voice signal) corresponding to a voice spoken by the user and feature points of a voice signal corresponding to the wake-up word.

According to an embodiment, the wake-up word recognition sensitivity may be related to a probability of accurately recognizing a spoken similar word as not the wake-up word when the similar word which is not the wake-up word is spoken. For example, when the wake-up word recognition sensitivity is high, the probability of recognizing the spoken similar word as not the wake-up word may increase. Accordingly, the number of times the robot 100a wakes up when the similar word is spoken may decrease. Meanwhile, when the wake-up word recognition sensitivity is low, the probability of recognizing the spoken similar word as not the wake-up word may be reduced. In this case, the number of times the robot 100a wakes up when the similar word is spoken may increase.

According to an embodiment, the wake-up word recognition sensitivity may be related to an order matching rate between each syllable or character of a word (text) recognized from a voice signal and each syllable or character of a registered wake-up word.

For example, the processor 180 may set a lower wake-up word recognition sensitivity as the measured sound volume increases. That is, even if a portion of the user's wake-up word is not recognized due to ambient noise and the matching rate is low, the processor 180 may determine that the wake-up word is input and wake up the robot 100a.

Meanwhile, when the measured sound volume is low, that is, in a quiet environment, if the user's wake-up word is more accurately recognized, the processor 180 may wake up the robot 100a only when the matching ratio is greater than or equal to a predetermined value.

In addition, the processor 180 may set a wake-up word recognition sensitivity in a case where voice of people is included in the noise to be higher than a wake-up word recognition sensitivity in a case where voice of people is not included in the noise. Accordingly, the number of times the robot 100a wakes up in response to a voice (such as conversation between users) that does not include the wake-up word may be reduced.

The robot 100a may recognize whether the wake-up word is included in voice data corresponding to the user's speech based on the set wake-up word recognition sensitivity (S130).

The processor 180 may check the matching rate by comparing a syllable, character, or word recognized from the voice signal of the voice data with a syllable, character, or word corresponding to the wake-up word. If the checked matching rate is greater than or equal to a matching rate reference based on the currently set wake-up word recognition sensitivity, the processor 180 may recognize that the wake-up word is included in the voice data.

When it is recognized that the wake-up word is included in the voice data, the processor 180 may switch the robot 100a from a standby state to a wake-up state. The robot 100a switched to the wake-up state may acquire a command or request from a voice additionally spoken by the user and perform a service such as performing an operation or providing information based on the acquired command or request.

Figure 7:
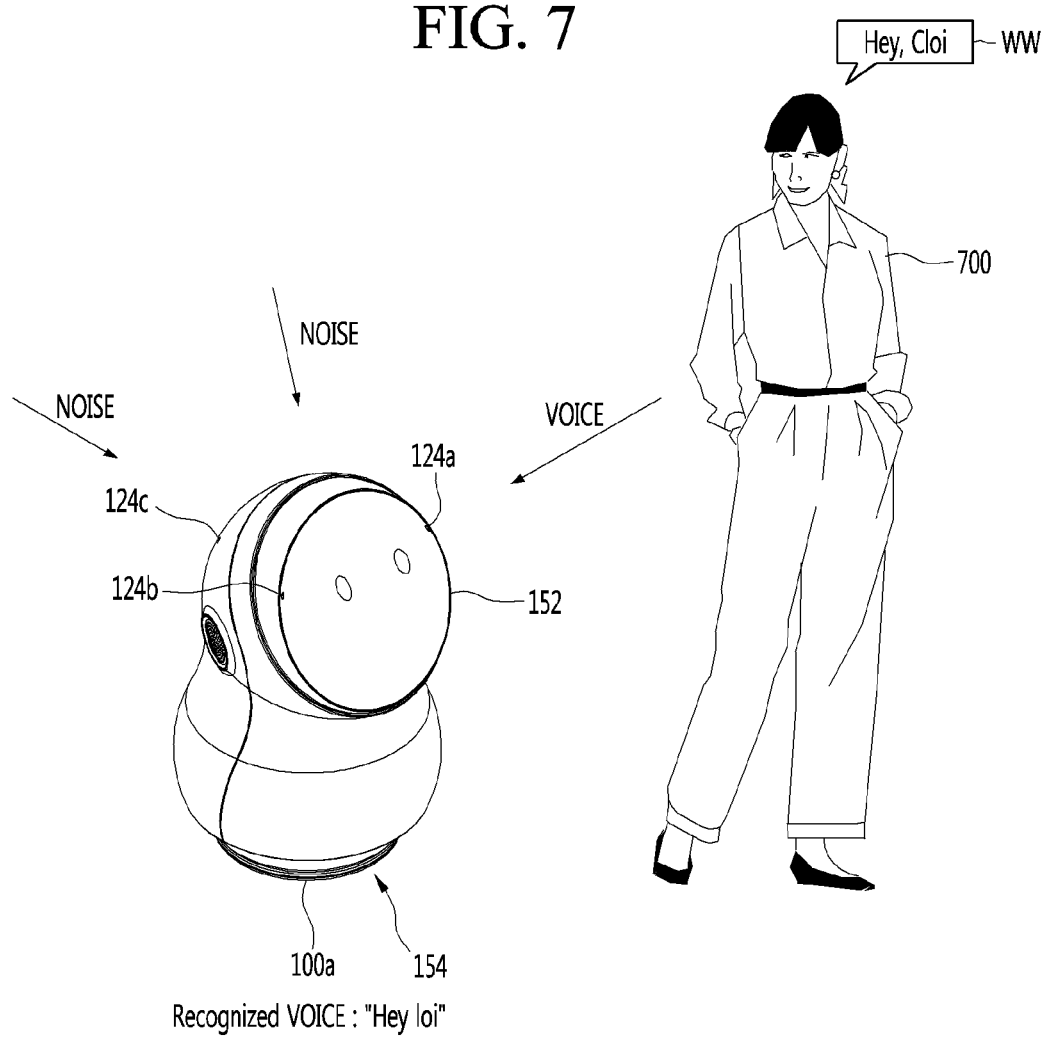
FIG. 7 is a view illustrating a situation in which a robot does not recognize a user's speech accurately due to ambient noise.

FIG. 7 is a view illustrating a situation in which a robot does not recognize the user's speech accurately due to ambient noise.

Referring to FIG. 7, the robot 100a may maintain activation of the microphones 124a to 124c even in a standby state.

In this case, the robot 100a may continuously acquire sound data NOISE corresponding to noise occurring from the space where the robot 100a is disposed.

Meanwhile, the user 700 may speak a wake-up word WW (e.g., "Hey Cloi") of the robot 100a to use the robot 100a.

The processor 180 may acquire voice data VOICE including the wake-up word WW through the microphones 124a to 124c. However, when acquiring the voice data VOICE, the processor 180 may acquire sound data NOISE corresponding to noise together.

The processor 180 may not recognize entirety of the wake-up word WW in the voice data VOICE due to the noise. For example, the processor 180 may recognize only "Hey loi" in "Hey Cloi".

If the processor 180 does not respond to the wake-up word speech of the user 700 because the entirety of the wake-up word WW is not recognized, the user 700 may feel inconvenient to speak the wake-up word WW again and satisfaction with the robot 100a may be lowered.

Accordingly, the robot 100a may adjust the wake-up word recognition sensitivity based on a volume and type of a sound corresponding to the noise, so that even if the wake-up word WW is not entirely recognized, the robot 100a may wake up by regarding the wake-up word WW as being spoken.

Hereinafter, a more specific embodiment related to setting of a wake-up word recognition sensitivity of the robot 100a will be described with reference to FIG. 8.

Figure 8:
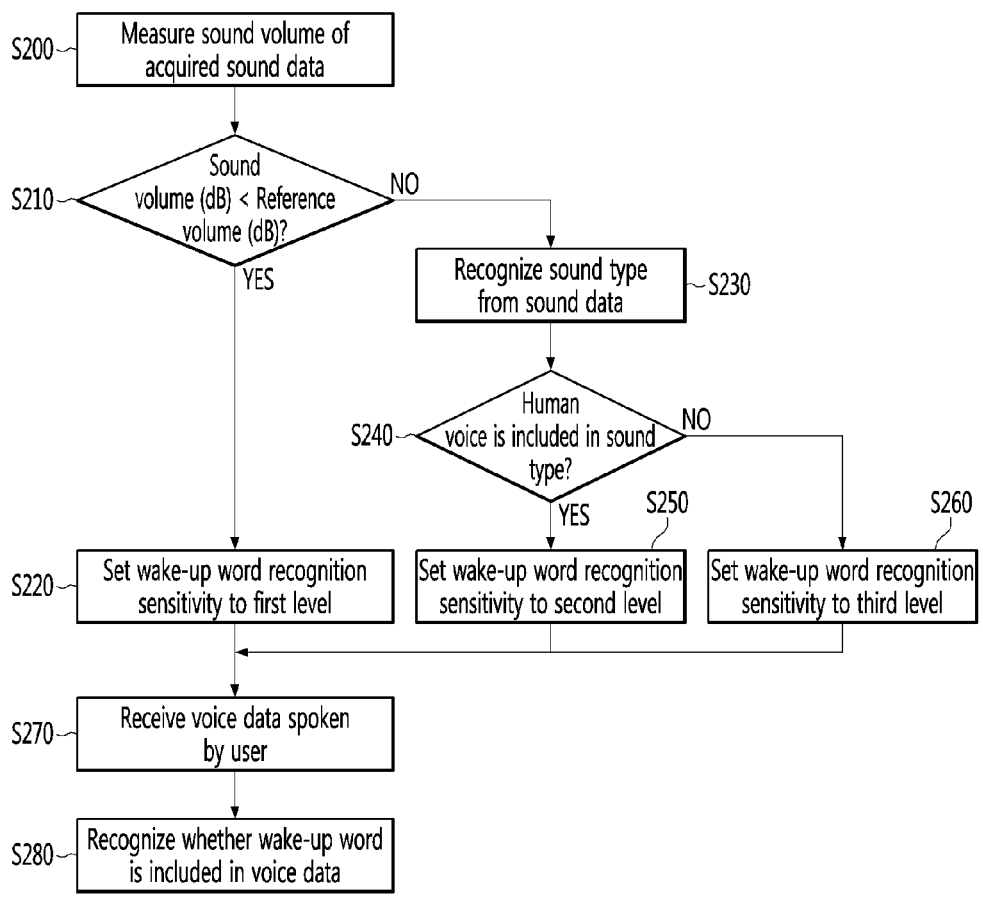
FIG. 8 is a flowchart specifically illustrating a wake-up word recognition sensitivity setting operation and a wake-up word recognition operation of a robot according to an embodiment of the present disclosure.

FIG. 8 is a flowchart specifically illustrating a wake-up word recognition sensitivity setting operation and a wake-up word recognition operation of a robot according to an embodiment of the present disclosure.

In FIG. 8, it is assumed that a wake-up word recognition sensitivity set in the robot 100*a* is any one of a first level, a second level, and a third level. However, according to an embodiment, the number of set levels that may be greater or fewer.

Referring to FIG. 8, the robot 100*a* may measure a sound volume of acquired sound data (S200).

As described above with reference to FIG. 6, the processor 180 may measure a sound volume based on an amplitude of a sound signal included in the sound data. For example, the processor 180 may represent the sound volume in the form of a volume relative to a reference volume such as a decibel (dB) unit.

When the measured sound volume is smaller than a predetermined reference volume (YES in S210), the robot 100*a* may set the wake-up word recognition sensitivity to the first level (S220).

For example, the first level may be a wake-up word recognition sensitivity in a quiet environment. That is, when the measured sound volume is smaller than the reference volume, the processor 180 may recognize that a noise environment of the space where the robot 100*a* is disposed is a quiet environment, and set the wake-up word recognition sensitivity to the first level.

The first level may be the wake-up word recognition sensitivity higher than the second level and the third level to be described below in steps S250 and S260. That is, when the measured sound volume is smaller than the predetermined reference volume, the processor 180 may set the wake-up word recognition sensitivity to the highest level.

For example, the first level may be 98% of a matching rate reference between the user's voice and the wake-up word but may be freely changed.

Meanwhile, if the measured sound volume is greater than or equal to the predetermined reference volume (NO in S210), the robot 100*a* may recognize a sound type from the acquired sound data (S230).

As described above with reference to FIG. 6, the processor 180 may recognize the type of the sound by analyzing the sound signal included in the sound data for each frequency band. According to an embodiment of the present disclosure, the processor 180 may classify the type of the sound based on whether a human voice is included in the noise.

For example, if a component proportion of a frequency band (e.g., 200 Hz to 3.5 kHz) corresponding to a human voice is greater than or equal to a reference proportion, the processor 180 may recognize that the human voice is included in the sound data.

If the human voice is included in the sound data (YES in S240) as a result of the recognition, the robot 100*a* may set the wake-up word recognition sensitivity to the second level (S250).

Meanwhile, if the human voice is not included in the sound data (NO in S240), the robot 100*a* may set the wake-up word recognition sensitivity to the third level (S260).

For example, the second level may be a wake-up word recognition sensitivity in an environment in which noise occurs due to human conversation. That is, when it is recognized that the human voice is included in the sound data, the processor 180 may set the wake-up word recognition sensitivity of the robot 100*a* to the second level.

According to an embodiment, the processor 180 may estimate the number of people based on the characteristics of the voice included in the sound data. For example, the processor 180 may estimate the number of people by recognizing each of the voices spoken by at least one person through frequency analysis or the like from the sound data. In this case, the processor 180 may set the wake-up word recognition sensitivity in a case where the estimated number of people is equal to or greater than a reference number, to be greater than the second level. Alternatively, the processor 180 may set the wake-up word recognition sensitivity to be higher as the estimated number of people increases.

The third level may be a wake-up word recognition sensitivity in an environment in which noise occurs due to factors (machines, etc.) other than human conversation. That is, when it is recognized that a human voice is not included in the sound data, the processor 180 may set the wake-up word recognition sensitivity of the robot 100*a* to the third level.

The second level may be lower than the wake-up word recognition sensitivity of the first level and higher than the wake-up word recognition sensitivity of the third level.

In other words, the processor 180 may set the wake-up word recognition sensitivity to the second level higher than the third level in order to prevent the robot 100*a* from waking up due to the voice included in the conversation of the surrounding people even when no one wants to use the robot 100*a*.

For example, the second level may be 92% of the matching rate reference between the user's voice and the wake-up word and the third level may be 85% of the matching rate reference but is not limited thereto.

Although not shown, the robot 100*a* may additionally adjust the wake-up word recognition sensitivity based on a sensing value of the illumination sensor 146. For example, at night, the degree of noise may be lower than that of the day.

When the sensing value of the illumination sensor 146 is lower than a reference sensing value (e.g., at night), the processor 180 may increase the set wake-up word recognition sensitivity. For example, in a state where the currently set wake-up word recognition sensitivity is the second level, if the sensing value of the illumination sensor 146 is lower than the reference sensing value, the processor 180 may set the wake-up word recognition sensitivity to a level between the first level and the second level. Meanwhile, when the sensing value of the illumination sensor 146 is higher than the reference sensing value (e.g., during the day), the processor 180 may set the wake-up word recognition sensitivity to a level between the second level and the third level.

The robot 100*a* may receive voice data corresponding to a voice spoken by the user (S270) and recognize whether or not a wake-up word is included in the received voice data based on the set wake-up word recognition sensitivity (S280).

Details related to steps S270 to S280 will be described below in more detail with reference to FIGS. 9 through 11.

Meanwhile, at least some of the operations illustrated in FIG. 8 may be performed by the server (e.g., the AI server 200) connected to the robot 100*a*. In this case, the robot 100*a* may transmit the acquired sound data to the server 200, and the processor 260 of the server 200 may perform steps S200 to S260 described above to set the wake-up word recognition sensitivity.

Then, the robot 100*a* may transmit the voice data spoken by the user to the server 200, and the server 200 may recognize whether or not the wake-up word is included in the voice data according to the set wake-up word recognition sensitivity and transmit a wake-up control signal based on the recognition result to the robot 100a. The robot 100a may or may not wake up based on the received wake-up control signal.

Figure 9:
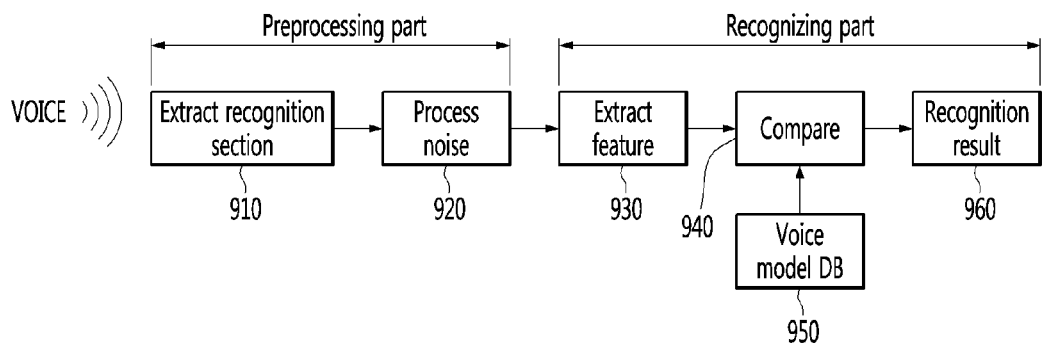
FIG. 9 is a view illustrating an operation of a robot recognizing a wake-up word by processing a voice signal according to a user's speech.

FIG. 9 is a view illustrating an operation of recognizing a wake-up word by processing a voice signal according to a user's speech. FIGS. 10 and 11 illustrate examples related to a result of recognizing a voice signal.

Referring to FIG. 9, the processor 180 may acquire voice data VOICE according to a user's speech through the microphone 124.

The processor 180 may recognize a voice from the voice data VOICE based on a voice recognition program or algorithm stored in the memory 170.

The processor 180 may extract a voice recognition section based on the voice signal characteristic of the received voice data VOICE (910).

The processor 180 may continuously acquire sound data generated around the robot 100a through the microphone 124. Here, at a time point when the user speaks a voice, characteristics of a signal may change as the voice data VOICE is included in the received sound data.

For example, the processor 180 may extract a signal corresponding to a time point at which the characteristic of the signal is changed to a time point at which the change in the characteristic is terminated, thereby extracting a recognition section corresponding to the voice data VOICE.

The processor 180 may remove noise of the voice signal corresponding to the extracted voice data VOICE (920). For example, the processor 180 may remove a signal component at a remaining frequency band excluding a frequency band (e.g., 200 Hz to 3.5 kHz) corresponding to a human voice using a band pass filter or the like. Alternatively, the processor 180 may remove noise by removing a component of a sound signal received before the acquisition of the voice data VOICE from the voice signal. Various methods related to noise removal are already well known, and a description thereof will be omitted.

The processor 180 may extract feature points for recognizing a syllable, a character, a word, or the like included in the voice signal from the noise-removed voice signal (930). For example, the feature points may be extracted based on signal strength, frequency characteristics, and signal or frequency pattern.

The processor 180 compares the extracted feature points with the feature points included in a voice model database 950 stored in the memory 170 (940) and output a recognition result of the syllable, character, or word included in the voice data VOICE based on the comparison result (960).

The voice model database 950 may store data regarding feature points of each of syllables, characters, or words. The processor 180 may compare each of the feature points extracted from the voice signal with feature points included in the voice model database 950, and acquire a syllable, character, or word corresponding to the feature points matched as a result of the comparison.

According to an embodiment, the processor 180 may acquire the recognition result of the syllable, the character, or the word corresponding to the feature points by inputting the extracted feature points as a machine learning-based learning model. The learning model may be learned by the learning processor 130 of the robot 100a or the learning processor 240 of the server 200.

The processor 180 may acquire a matching rate by comparing the syllable, character, or word included in the output recognition result with a predetermined wake-up word.

If the acquired matching rate is equal to or greater than a matching rate reference of the currently set wake-up word recognition sensitivity, the processor 180 may recognize that the wake-up word is included in the voice data VOICE, and wake up the robot 100a.

Figure 10:
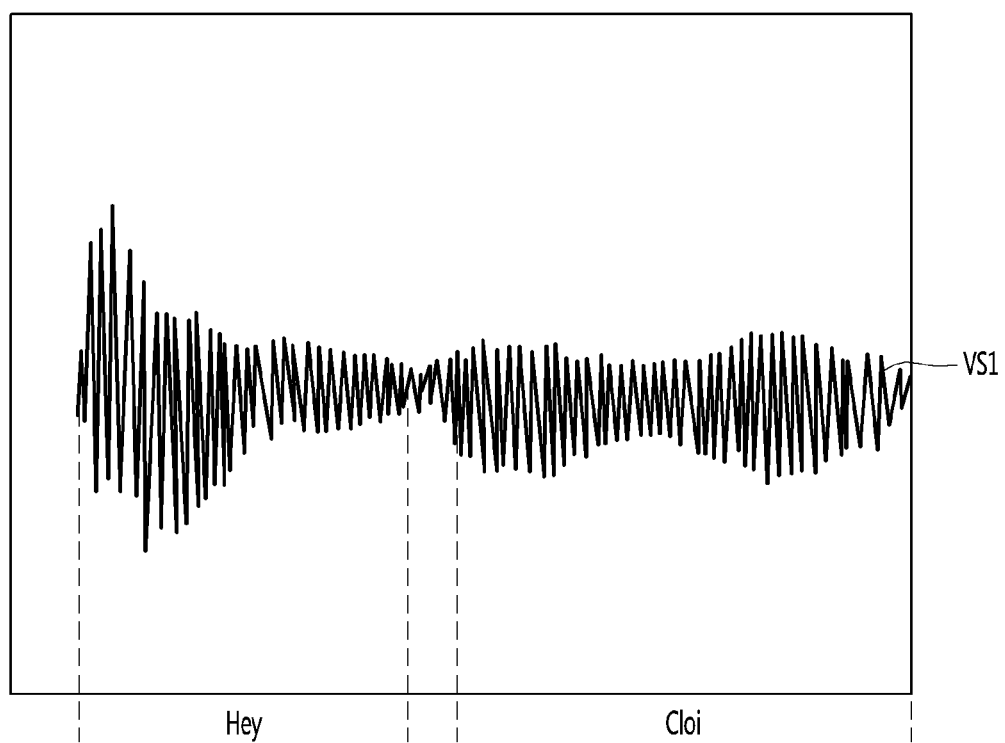
FIGS. 10 to 11 illustrate examples related to results of recognizing a voice signal.

Referring to FIG. 10, the processor 180 may acquire first voice data spoken by the user through the microphone 124.

The processor 180 may recognize characters included in the user's speech from a first voice signal VS1 included in the acquired first voice data.

For example, if noise is sufficiently low when the user speaks and if the user normally speaks the wake-up word, the processor 180 may recognize the characters "Hey Cloi" from the first voice signal VS1.

The processor 180 may compare the recognized characters "Hey Cloi" with the predetermined wake-up word "Hey Cloi". Since the recognized characters and the characters of the predetermined wake-up word are completely matched as a result of the comparison, the processor 180 may recognize that the user speaks the wake-up word, and may wake up the robot 100a.

If the recognized characters are completely matched to the predetermined wake-up word, the robot 100a will wake up regardless of the set wake-up word recognition sensitivity.

Figure 11:
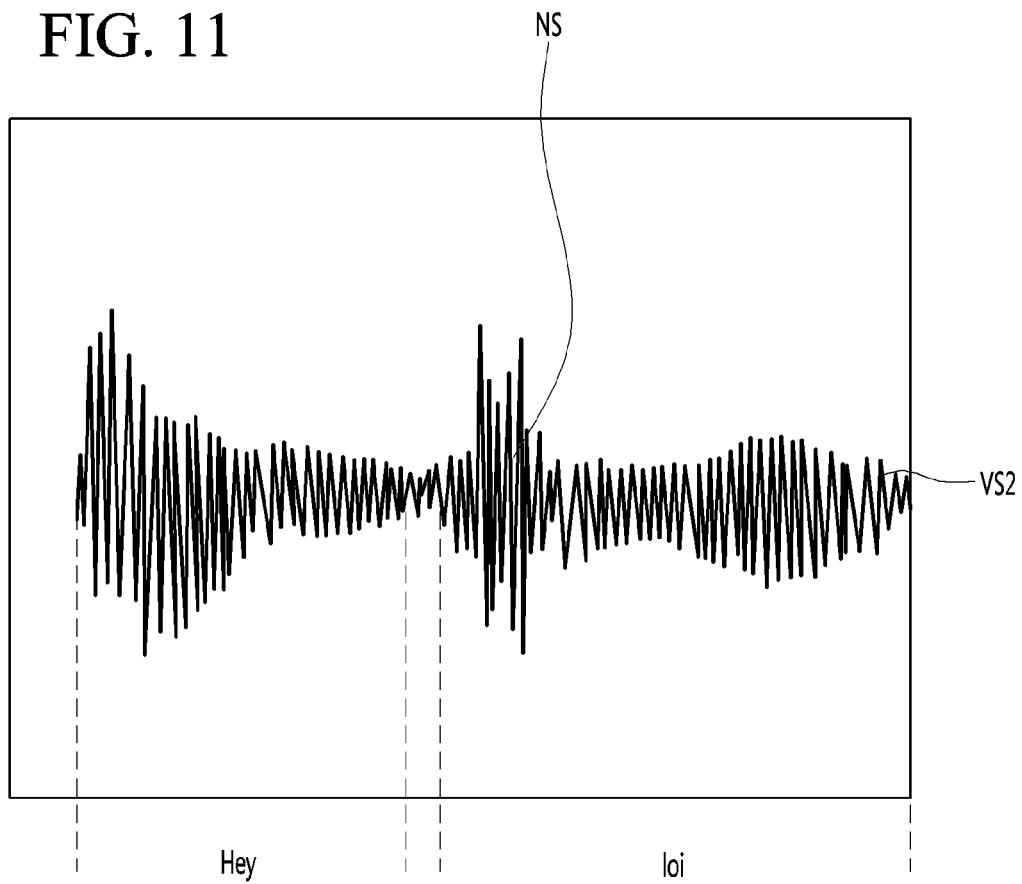

Meanwhile, referring to FIG. 11, the processor 180 may acquire second voice data spoken by the user through the microphone 124.

The processor 180 may recognize characters spoken by the user from a second voice signal VS2 included in the acquired second voice data.

For example, if noise occurs at a predetermined time during speech of the user, a noise signal NS may be included in the second voice signal VS2. The processor 180 may recognize only "Hey loi" from the second voice signal VS2 due to the noise signal NS.

The processor 180 may acquire a matching rate by comparing the recognized characters "Hey loi" with the predetermined wake-up word "Hey Cloi". As a result of the comparison, the matching rate between the recognized characters and the characters of the predetermined wake-up word may be about 85.7%.

The processor 180 may determine whether to wake up the robot 100a based on the acquired matching rate and the currently set wake-up word recognition sensitivity.

For example, when the wake-up word recognition sensitivity is the first level, the matching rate reference may be 98%. In this case, since the acquired matching rate is lower than the matching rate reference, the processor 180 may recognize that the user's speech does not include the wake-up word, and may not wake up the robot 100a.

In addition, when the wake-up word recognition sensitivity is the second level, the matching rate reference may be 92%. Since the acquired matching rate is lower than the matching rate reference, the processor 180 may recognize that the user's speech does not include the wake-up word, and may not wake up the robot 100a.

Meanwhile, when the wake-up word recognition sensitivity is the third level, the matching rate reference may be 85%. In this case, since the acquired matching rate is higher than the matching rate reference, the processor 180 may recognize that the user's speech includes the wake-up word, and may wake up the robot 100a.

That is, the processor 180 may wake up or may not wake up the robot 100a over the same matching rate according to the wake-up word recognition sensitivity set based on the ambient noise environment. In particular, when the ambient noise is severe, the processor 180 may wake up the robot 100a by lowering the wake-up word recognition sensitivity, even if the matching rate is low.

Figure 12:
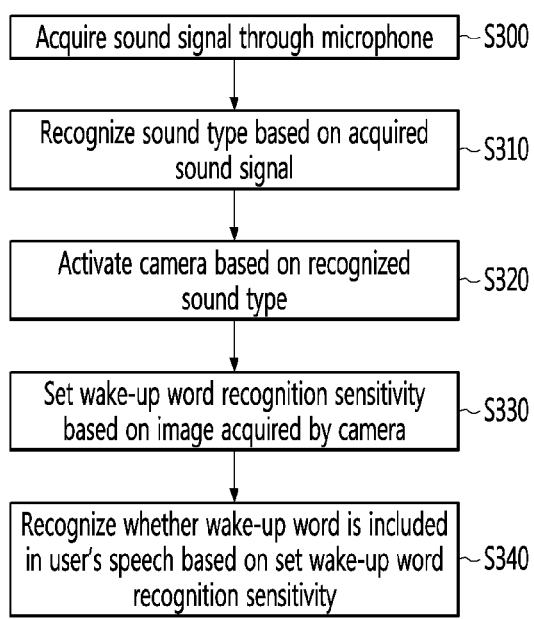
FIG. 12 is a flowchart illustrating a wake-up word recognition operation of a robot according to an embodiment.

FIG. 12 is a flowchart illustrating a wake-up word recognition operation of a robot according to an embodiment.

Unlike the embodiment described above with reference to FIGS. 6 and 8, in the embodiments illustrated in FIGS. 12 and 13, the robot 100a may accurately recognize whether a voice spoken by a person is included in an ambient sound (noise, etc.) using the camera 142.

Referring to FIG. 12, the robot 100a may acquire a sound signal corresponding to a sound generated in the vicinity of the robot 100a through the microphone 124 (S300).

As the microphone 124 is activated, the processor 180 may acquire a sound signal (or sound data) corresponding to the sound generated in the surroundings.

The robot 100a may recognize a type (characteristic) of the sound based on the acquired sound signal (S310).

For example, the processor 180 may recognize the type of sound according to a frequency characteristic, an amplitude characteristic, and the like of the sound signal. For example, the processor 180 may recognize the type of the sound by analyzing the sound signal for each frequency band.

Specifically, the processor 180 may classify the type of sound based on whether the sound signal includes a component corresponding to a human voice.

The robot 100a may activate the camera 142 based on the recognized sound type (S320). The robot 100a may set the wake-up word recognition sensitivity based on an image acquired by the activated camera 142 (S330).

When a human voice is recognized from the sound signal, the processor 180 may activate the camera 142 which is in an inactive state.

As the camera 142 is activated, an image of a predetermined region around the robot 100a may be acquired. For example, the processor 180 may control the activated camera 142 to acquire an image for a reference time.

The processor 180 may set a wake-up word recognition sensitivity based on the acquired image. For example, the processor 180 may recognize the presence or absence of a person from the acquired image through a known image recognition technique, and may set the wake-up word recognition sensitivity to be different according to the presence or absence of a person.

As described above with reference to FIG. 6 and the like, the wake-up word recognition sensitivity may refer to the degree to which the wake-up word is determined to be included in a voice spoken by the user.

The processor 180 may set the wake-up word recognition sensitivity in a case where the presence of a person is recognized from the image to be higher than the wake-up word recognition sensitivity in a case where the presence of a person is not recognized. Accordingly, the number of times the robot 100a wakes up in response to a voice (such as a conversation between users) that does not include a wake-up word may be reduced.

That is, when a human voice is recognized from the acquired sound signal, the processor 180 further recognizes whether a person is present near the robot 100a from the image acquired through the camera 142, thereby more accurately recognizing a voice spoken by a person. In particular, the processor 180 may activate the camera 142 when a human voice is recognized from the sound signal, thereby effectively saving power consumption compared to maintaining the activated state of the camera 142.

According to an embodiment of the present disclosure, the processor 180 may set the wake-up word recognition sensitivity in a case where people equal to or greater than a reference number is recognized from the image to be higher than the wake-up word recognition sensitivity in a case where people less than the reference number is recognized from the image.

According to an embodiment of the present disclosure, the processor 180 may set the wake-up word recognition sensitivity to be higher as the number of people recognized from the image increases.

The robot 100a may recognize whether a wake-up word is included in voice data corresponding to the user's speech based on the set wake-up word recognition sensitivity (S340).

When it is recognized that the wake-up word is included in the voice data, the processor 180 may switch the robot 100a from a standby state to a wake-up state.

As the robot 100a wakes up, a predetermined screen may be output through the display 152 or a predetermined sound may be output through the sound output interface 154.

The robot 100a switched to the wake-up state may acquire a command or request from a voice additionally spoken by a user, and perform a service such as performing an operation or providing information based on the acquired command or request.

FIG. 13 is a flowchart specifically illustrating a wake-up word recognition sensitivity setting operation and a wake-up word recognition operation of a robot according to an embodiment of the present disclosure.

Referring to FIG. 13, the robot 100a may recognize a type (characteristic) of a sound from an acquired sound signal (S400).

Since step S400 has been described above in step S310 of FIG. 12, a description thereof will be omitted.

When it is recognized that the sound includes a human voice (YES in S410), the robot 100a may activate the camera 142 in an inactive state and acquires an image around the robot through the activated camera 142 (S420).

As the camera 142 is activated, an image of a predetermined area around the robot 100a may be acquired. For example, the processor 180 may control the activated camera 142 to acquire an image for the reference time.

According to an embodiment, the processor 180 may control the rotation mechanism 160 to rotate the robot 100a to acquire the image, thereby acquiring image including various areas around the robot.

According to another embodiment, the processor 180 may estimate a sound generation direction from a sound signal acquired through the plurality of microphones 124a to 124c (see FIG. 4). In this case, the processor 180 may control the rotation mechanism 160 so that the camera 142 faces the estimated sound generation direction, and acquire an image through the camera 142.

The robot 100a may recognize the presence or absence of a person from the acquired image (S430).

The processor 180 may recognize the presence or absence of a person from the acquired image through a known image recognition technique.

When a person is recognized from the image (YES in S440), the robot 100a may set the wake-up word recognition sensitivity to the second level (S450).

The second level may correspond to the second level described above with reference to FIG. 8.

That is, when a human voice is recognized from the acquired sound signal, the processor 180 further recognizes whether a person is present near the robot 100a from the image acquired through the camera 142, thereby accurately recognizing a voice spoken by the person.

According to an embodiment of the present disclosure, the processor 180 may set the wake-up word recognition sensitivity in a case where people corresponding to the reference number or greater is recognized to be higher than the wake-up word recognition sensitivity in a case where the number of people less than the reference number is recognized (e.g., the second level).

According to an embodiment of the present disclosure, the processor 180 may set the wake-up word recognition sensitivity to be higher as the number of people recognized from the image increases.

Meanwhile, when it is recognized that the sound does not include a human voice (NO in S410) or when no person is recognized from the image (NO in S440), the robot 100a may set the wake-up word recognition sensitivity by determining that the sound is not generated by a person.

In FIG. 13, an example of setting the wake-up word recognition sensitivity based on a sound volume when a person is not recognized from the image is illustrated (S460 to S480). Specifically, the processor 180 may measure a sound volume from a sound signal. When the measured sound volume is smaller than a reference volume (YES in S460), the processor 180 may set the wake-up word recognition sensitivity to a first level (S470). Meanwhile, when the measured sound volume is larger than the reference volume (NO in S460), the processor 180 may set the wake-up word recognition sensitivity to a third level (S480). The first level and the third level may correspond to the first level and the third level described above with reference to FIG. 8.

However, according to an embodiment, when a person is not recognized from the image, the robot 100a may set the wake-up word recognition sensitivity to be lower than the second level regardless of the sound volume. That is, the robot 100a may set the wake-up word recognition sensitivity in a case where a human voice is included in the sound to be higher than the wake-up word recognition sensitivity in a case where a human voice is not included. Accordingly, the number of times the robot 100a erroneously wakes up in response to a voice (such as a conversation between users) that does not include the wake-up word may be effectively reduced.

In addition, as described above with reference to FIG. 8, the robot 100a may further adjust the wake-up word recognition sensitivity based on a sensing value of the illumination sensor 146.

The robot 100a may receive voice data corresponding to a voice spoken by the user (S490) and recognize whether or not the wake-up word is included in the received voice data based on the set wake-up word recognition sensitivity (S500).

At least some of the operations illustrated in FIG. 13 may be performed by the server (e.g., the AI server 200) connected to the robot 100a. In this case, the robot 100a may transmit the acquired sound signal to the server 200, and the processor 260 of the server 200 may set the wake-up word recognition sensitivity by performing steps S400 to S480 described above.

The robot 100a may transmit the voice data spoken by the user to the server 200, and the server 200 may recognize whether the wake-up word is included in the voice data according to the set wake-up word recognition sensitivity and transmit a wake-up control signal to the robot 100a based on the recognition result to the robot 100a. The robot 100a may or may not wake up based on the received wake-up control signal.

According to an embodiment of the present disclosure, the robot 100a or the server 200 may vary the wake-up word recognition sensitivity according to a noise level around the robot 100a, thereby smoothly recognizing the wake-up word regardless of the ambient noise level. Accordingly, it is possible to effectively reduce user inconvenience due to a decrease in the recognition rate of the wake-up word.

According to an embodiment of the present disclosure, the robot or the server connected thereto may recognize the wake-up word smoothly in various situations by varying the wake-up word recognition sensitivity according to the noise characteristics around the robot. Accordingly, it is possible to effectively reduce the user inconvenience due to the decrease in the recognition rate of the wake-up word.

In addition, the robot may activate the camera only when it is detected that the acquired sound includes a human voice, thereby effectively reducing power consumption compared to a case where the camera is always activated.

The above description is to simply illustrate the technical scope of the present invention and various modifications and substitutions can be made by those skilled in the art without departing from the scope of the present invention.

Therefore, the embodiments disclosed in the present invention do not intend to limit the technical scope of the present invention, but to explain the present invention, and the technical scope of the present invention will not be limited by the embodiments, but shall be interpreted as defined in the claims.

All technical scopes within the scope of the claims should be interpreted to be included within the scope of the present invention.

What is claimed is:

1. A robot comprising:
a microphone configured to acquire a sound signal corresponding to a sound generated near the robot;
a camera;
an output interface including at least one of a display configured to output a wake-up screen or a speaker configured to output a wake-up sound when the robot wakes up;
an illumination sensor; and
a processor configured to:
recognize whether the acquired sound signal includes a voice of a person;
activate the camera based on recognizing that the acquired sound signal includes the voice of the person;
recognize whether the person is present in an image acquired by the activated camera;
set a wake-up word recognition sensitivity based on a result of recognizing whether a person is present in the acquired image;
measure, using the illumination sensor, an intensity of illumination of a space in which the robot is disposed;
increase the set wake-up word recognition sensitivity based on a sensing value of the illumination sensor being lower than a reference sensing value, and decrease the set wake-up word recognition sensitivity based on the sensing value of the illumination sensor being higher than the reference sensing value; and
recognize whether a wake-up word is included in voice data of a user acquired through the microphone based on the set wake-up word recognition sensitivity.

2. The robot of claim 1, wherein the processor is configured to set the wake-up word recognition sensitivity to a first level when the person is recognized from the acquired image.

3. The robot of claim 2, wherein the processor is configured to set the wake-up word recognition sensitivity to be higher than the first level when a number of people equal to or larger than a reference number are recognized from the acquired image.

4. The robot of claim 2, wherein the processor is configured to set the wake-up word recognition sensitivity to a second level lower than the first level when no person is recognized from the acquired image.

5. The robot of claim 2, wherein the processor is configured to measure a sound volume based on the sound signal if no person is recognized from the acquired image, and set the wake-up word recognition sensitivity based on the measured sound volume.

6. The robot of claim 5, wherein the processor is configured to set the wake-up word recognition sensitivity to a second level lower than the first level when the measured sound volume is larger than a reference volume, and set the wake-up word recognition sensitivity to a third level higher than the first level when the measured sound volume is smaller than the reference volume.

7. The robot of claim 1, wherein the processor is configured to recognize whether the voice of the person is included in the sound signal based on a signal component having a frequency band corresponding to the voice of the person, in the sound signal.

8. The robot of claim 7, wherein the processor is configured to measure a sound volume based on the sound signal when it is recognized that the voice of the person is not included in the sound signal, and set the wake-up word recognition sensitivity to be lower as the measured sound volume is larger.

9. The robot of claim 1, wherein the processor is configured to:
recognize at least one of a syllable, a character, or a word spoken by the user from the voice data,
compare the recognized at least one of the syllable, character, or word with the wake-up word, and
recognize whether the wake-up word is included in the voice data based on a comparison result and the wake-up word recognition sensitivity.

10. The robot of claim 9, wherein the processor is configured to:
acquire a matching rate between the recognized at least one of the syllable, character, or word and the wake-up word, and
recognize that the voice data includes the wake-up word when the acquired matching rate is higher than a reference matching rate of a current set wake-up word recognition sensitivity.

11. The robot of claim 9, further comprising a memory storing a learning model trained based on machine learning, and
wherein the processor is configured to recognize the at least one of the syllable, character, or word from feature points extracted from the voice data through the learning model.

12. The robot of claim 1, wherein the processor is configured to control the output interface to output at least one of the wake-up screen or the wake-up sound as the robot wakes up when it is recognized that the voice data includes the wake-up word.

13. The robot of claim 1, further comprising a transceiver configured to be connected to a server,
wherein the processor is configured to:
transmit the acquired sound signal to the server,
transmit the acquired voice data to the server,
receive a wake-up control signal based on a result of recognizing whether the wake-up word is included in the voice data from the server, and
control the output interface based on the received wake-up control signal.

14. A method of recognizing a wake-up word using a robot, the method comprising:
acquiring a sound signal through a microphone of the robot;
recognizing whether the acquired sound signal includes a voice of a person;
activating a camera included in the robot based on recognizing that the acquired sound signal includes the voice of the person;
recognizing whether a person is present in an image acquired by the activated camera;
setting a wake-up word recognition sensitivity based on a result of recognizing whether the person is present in the acquired image;
increasing or decreasing the set wake-up word recognition sensitivity based on a sensing value measured through an illumination sensor of the robot;
recognizing whether the wake-up word is included in voice data of a user acquired through the microphone based on the set wake-up word recognition sensitivity; and
waking up the robot based on recognizing that the wake-up word is included in the voice data.

15. The method of claim 14, wherein the setting of the wake-up word recognition sensitivity comprises setting the wake-up word recognition sensitivity when the person is recognized from the acquired image to be higher than the wake-up word recognition sensitivity when no person is recognized.

16. The method of claim 14, wherein
the setting of the wake-up word recognition sensitivity comprises:
measuring a sound volume based on the sound signal when no person is recognized from the acquired image; and
setting the wake-up word recognition sensitivity based on the measured sound volume.

17. The method of claim 16, wherein
the setting of the wake-up word recognition sensitivity based on the measured sound volume comprises:
setting a wake-up word recognition sensitivity lower than the wake-up word recognition sensitivity of a case where the person is recognized when the sound volume is greater than a reference volume; and
setting a wake-up word recognition sensitivity higher than the wake-up word recognition sensitivity of the case where the person is recognized when the sound volume is smaller than the reference volume.

18. A server comprising:
a transceiver configured to receive a sound signal corresponding to a sound generated near a robot from the robot; and
a processor configured to:
receive an image in a vicinity of the robot from the robot through the transceiver when a voice of a person is recognized from the received sound signal;
recognize whether the person is present from the received image;
set a wake-up word recognition sensitivity based on a result of recognizing whether the person is present;

increase or decrease the set wake-up word recognition sensitivity based on a sensing value measured through an illumination sensor of the robot; and recognize whether a wake-up word is included from voice data of a user received through the transceiver based on the set wake-up word recognition sensitivity.

\* \* \* \* \*